United States Patent
Faynberg et al.

(10) Patent No.: US 11,822,946 B2
(45) Date of Patent: *Nov. 21, 2023

(54) SYSTEMS AND METHODS FOR SECURE NETWORK MANAGEMENT OF VIRTUAL NETWORK FUNCTIONS

(71) Applicant: CABLE TELEVISION LABORATORIES, INC, Louisville, CO (US)

(72) Inventors: Igor Faynberg, East Brunswick, NJ (US); Donald E. A. Clarke, Louisville, CO (US); Steven J. Goeringer, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 675 days.

This patent is subject to a terminal disclaimer.

(21) Appl. No.: 16/457,278

(22) Filed: Jun. 28, 2019

(65) Prior Publication Data

US 2020/0004572 A1    Jan. 2, 2020

Related U.S. Application Data

(60) Provisional application No. 62/691,259, filed on Jun. 28, 2018.

(51) Int. Cl.
*G06F 9/455* (2018.01)
*H04L 29/06* (2006.01)
(Continued)

(52) U.S. Cl.
CPC ...... *G06F 9/45558* (2013.01); *H04L 43/0817* (2013.01); *H04L 63/04* (2013.01); *G06F 2009/45595* (2013.01); *H04L 45/42* (2013.01)

(58) Field of Classification Search
CPC ....... G06F 9/45558; G06F 2009/45595; H04L 43/0817; H04L 63/04; H04L 45/42;
(Continued)

(56) References Cited

U.S. PATENT DOCUMENTS 6,728,780 B1 * 4/2004 Hebert ................ G06F 11/2007
714/4.11
7,411,973 B2 * 8/2008 McDaniel ............. H04L 43/028
370/463
(Continued)

FOREIGN PATENT DOCUMENTS

CN 110278101 A * 9/2019 ......... G06F 9/45558
CN 108259216 B * 9/2021 ........... G06F 21/552
(Continued)

*Primary Examiner* — David R Lazaro
*Assistant Examiner* — Berhanu Shitayewoldetadik
(74) *Attorney, Agent, or Firm* — Armstrong Teasdale LLP

(57) ABSTRACT

A virtual network system for a computer network is provided. The system includes a first host executing a virtual network function manager. The system also includes a second host executing a management virtual machine. The management virtual machine is in communication with the virtual network function manager and with one or more virtual network function component instantiations. The management virtual machine is programmed to route messages between the one or more virtual network function component instantiations and the virtual network function manager.

14 Claims, 2 Drawing Sheets

(51) Int. Cl.
*G06F 15/16* (2006.01)
*H04L 15/16* (2006.01)
*H04L 45/02* (2022.01)
*H04L 45/42* (2022.01)
*H04L 45/586* (2022.01)
*H04L 9/40* (2022.01)
*H04L 43/0817* (2022.01)

(58) Field of Classification Search
CPC ... H04L 63/145; H04L 63/1458; H04L 63/30; H04L 63/12
USPC ......................................................... 709/226
See application file for complete search history.

(56) References Cited

U.S. PATENT DOCUMENTS

| | | | | |
|---|---|---|---|---|
| 8,250,641 B2 * | 8/2012 | Morgan | H04L 63/0227 | 726/11 |
| 8,370,834 B2 * | 2/2013 | Edwards | G06F 9/5077 | 718/1 |
| 9,183,028 B1 * | 11/2015 | Brandwine | H04L 67/56 | |
| 9,256,393 B2 * | 2/2016 | Ivashin | H04L 67/01 | |
| 10,205,698 B1 * | 2/2019 | Petersen | H04L 61/5038 | |
| 10,469,317 B1 * | 11/2019 | Jiang | H04L 41/082 | |
| 10,545,778 B1 * | 1/2020 | Venkata | G06F 9/45558 | |
| 10,601,909 B2 * | 3/2020 | Brandwine | H04L 67/1097 | |
| 10,644,933 B2 * | 5/2020 | Cohn | H04L 41/12 | |
| 10,664,301 B2 * | 5/2020 | Tsirkin | G06F 9/45558 | |
| 10,678,592 B2 * | 6/2020 | Enomoto | G05B 19/0428 | |
| 10,693,801 B2 * | 6/2020 | Tsirkin | H04L 41/0816 | |
| 10,756,990 B1 * | 8/2020 | Chakkassery Vidyadharan | G06F 11/301 | |
| 10,764,115 B1 * | 9/2020 | Melkild | H04L 41/0654 | |
| 10,764,118 B1 * | 9/2020 | Melkild | H04L 41/0668 | |
| 10,826,723 B1 * | 11/2020 | Strauss | G06F 9/45558 | |
| 10,904,268 B2 * | 1/2021 | Brandwine | H04L 63/1408 | |
| 11,082,298 B2 * | 8/2021 | Wang | H04L 41/0894 | |
| 11,115,317 B1 * | 9/2021 | Melkild | H04L 67/10 | |
| 11,196,616 B1 * | 12/2021 | Melkild | G06F 11/0757 | |
| 11,533,271 B2 * | 12/2022 | Bernat | H04L 47/762 | |
| 2003/0058274 A1 * | 3/2003 | Hill | H04L 63/0272 | 715/751 |
| 2004/0179546 A1 * | 9/2004 | McDaniel | H04L 43/028 | 709/250 |
| 2006/0010238 A1 * | 1/2006 | Craft | H04L 45/245 | 709/227 |
| 2006/0087940 A1 * | 4/2006 | Brewer | G06F 11/2061 | 369/47.12 |
| 2009/0119684 A1 * | 5/2009 | Mahalingam | G06F 9/45558 | 719/324 |
| 2010/0107162 A1 * | 4/2010 | Edwards | H04L 45/58 | 718/1 |
| 2012/0017031 A1 * | 1/2012 | Mashtizadeh | G06F 15/17331 | 711/6 |
| 2012/0102190 A1 * | 4/2012 | Durham | G06F 9/45558 | 718/1 |
| 2013/0024855 A1 * | 1/2013 | North | G06F 11/2097 | 718/1 |
| 2013/0047151 A1 * | 2/2013 | Sridharan | H04L 65/102 | 718/1 |
| 2013/0159535 A1 * | 6/2013 | Zhang | H04L 65/1066 | 709/227 |
| 2014/0052864 A1 * | 2/2014 | Van Der Linden | H04L 47/70 | 709/226 |
| 2015/0033224 A1 * | 1/2015 | Maheshwari | G06F 9/5011 | 718/1 |
| 2015/0326542 A1 * | 11/2015 | Serebrin | H04L 9/0822 | 713/160 |
| 2015/0378760 A1 * | 12/2015 | Su | G06F 9/45558 | 718/1 |
| 2016/0055019 A1 * | 2/2016 | Thakkar | H04L 43/0876 | 718/1 |
| 2016/0057005 A1 * | 2/2016 | Thakkar | H04L 41/0897 | 714/4.11 |
| 2016/0057006 A1 * | 2/2016 | Thakkar | G06F 9/45558 | 709/222 |
| 2016/0080317 A1 * | 3/2016 | Brandwine | H04L 67/565 | 709/245 |
| 2016/0099860 A1 * | 4/2016 | Huang | H04L 45/70 | 370/389 |
| 2016/0132347 A1 * | 5/2016 | Brandwine | G06F 9/5088 | 718/1 |
| 2016/0191545 A1 * | 6/2016 | Nanda | H04L 43/20 | 726/1 |
| 2016/0226834 A1 * | 8/2016 | Dawson | H04L 63/0428 | |
| 2016/0248626 A1 * | 8/2016 | Vernia | H04L 41/0895 | |
| 2017/0017512 A1 * | 1/2017 | Csatari | G06F 9/4856 | |
| 2017/0063801 A1 * | 3/2017 | Faynberg | H04L 63/0281 | |
| 2017/0078216 A1 * | 3/2017 | Adolph | H04L 41/0895 | |
| 2017/0104679 A1 * | 4/2017 | Sunavala | H04L 45/306 | |
| 2017/0147374 A1 * | 5/2017 | Tsirkin | G06F 9/45545 | |
| 2017/0147378 A1 * | 5/2017 | Tsirkin | G06F 9/45558 | |
| 2017/0149729 A1 * | 5/2017 | Tsirkin | H04L 41/20 | |
| 2017/0180325 A1 * | 6/2017 | Palermo | H04L 41/0894 | |
| 2017/0212784 A1 * | 7/2017 | Johnsen | H04L 41/0806 | |
| 2018/0004539 A1 * | 1/2018 | Liguori | G06F 9/45558 | |
| 2018/0013674 A1 * | 1/2018 | Nainar | G06F 9/455 | |
| 2018/0052701 A1 * | 2/2018 | Kaplan | G06F 9/45558 | |
| 2018/0052702 A1 * | 2/2018 | Kaplan | G06F 9/45558 | |
| 2018/0060105 A1 * | 3/2018 | Shimizu | G06F 9/45558 | |
| 2018/0095774 A1 * | 4/2018 | Atta | G06F 15/76 | |
| 2018/0115519 A1 * | 4/2018 | Bonomi | H04L 63/1458 | |
| 2018/0124171 A1 * | 5/2018 | Han | H04L 45/566 | |
| 2018/0302343 A1 * | 10/2018 | Lokman | H04L 41/122 | |
| 2019/0041824 A1 * | 2/2019 | Chavez | H04L 67/1048 | |
| 2019/0081891 A1 * | 3/2019 | Mundkur | H04L 45/54 | |
| 2019/0158396 A1 * | 5/2019 | Yu | H04L 61/5007 | |
| 2019/0215243 A1 * | 7/2019 | Wang | H04L 41/0895 | |
| 2019/0235898 A1 * | 8/2019 | Koehler | G06F 9/45558 | |
| 2019/0260685 A1 * | 8/2019 | Tsirkin | H04L 41/5009 | |
| 2019/0280971 A1 * | 9/2019 | Yu | H04L 12/4641 | |
| 2019/0294446 A1 * | 9/2019 | Liguori | G06F 9/45558 | |
| 2019/0319896 A1 * | 10/2019 | Guo | H04L 49/252 | |
| 2019/0334781 A1 * | 10/2019 | Caldwell | H04L 41/12 | |
| 2020/0076685 A1 * | 3/2020 | Vaidya | G06F 8/60 | |
| 2020/0293359 A1 * | 9/2020 | Xia | H04L 41/28 | |
| 2020/0364073 A1 * | 11/2020 | Obara | H04L 12/46 | |
| 2020/0389469 A1 * | 12/2020 | Litichever | H04W 4/40 | |
| 2021/0191784 A1 * | 6/2021 | Rauschenbach | H04L 12/4641 | |
| 2021/0232467 A1 * | 7/2021 | Witt | G06F 11/203 | |
| 2021/0377166 A1 * | 12/2021 | Brar | H04L 12/1886 | |
| 2022/0329676 A1 * | 10/2022 | Wouhaybi | H04L 67/34 | |
| 2022/0360653 A1 * | 11/2022 | Wouhaybi | H04L 67/565 | |
| 2022/0385598 A1 * | 12/2022 | Pismenny | H04L 49/552 | |

FOREIGN PATENT DOCUMENTS

| | | | | |
|---|---|---|---|---|
| EP | 3343368 A1 * | 7/2018 | | G06F 21/552 |
| EP | 3576359 B1 * | 8/2021 | | G06F 9/455 |
| KR | 20180100605 A * | 9/2018 | | H04L 12/46 |
| WO | WO-2010127365 A1 * | 11/2010 | | G06F 9/5077 |
| WO | WO-2013064189 A1 * | 5/2013 | | G06F 9/455 |
| WO | WO-2015121750 A1 * | 8/2015 | | G06F 9/45558 |
| WO | WO-2016184283 A1 * | 11/2016 | | G06F 9/45504 |
| WO | WO-2017012381 A1 * | 1/2017 | | G06F 9/45558 |
| WO | WO-2018049256 A1 * | 3/2018 | | G06F 9/45533 |
| WO | WO-2018181840 A1 * | 10/2018 | | G06F 13/10 |

* cited by examiner

SYSTEMS AND METHODS FOR SECURE NETWORK MANAGEMENT OF VIRTUAL NETWORK FUNCTIONS

CROSS REFERENCE TO RELATED APPLICATIONS

This application claims the benefit of and priority to U.S. Provisional Patent Application Ser. No. 62/691,259, filed Jun. 28, 2018, which is incorporated herein by reference in its entirety.

BACKGROUND

The field of the disclosure relates generally to management of computer networks, and more particularly, to secure management of virtual network functions.

The European Telecommunication Standards Institute (ETSI) has generated the Management and Operations (MANO) architecture for Network Function Virtualization (NFV). This architecture is designed as a blueprint for developing products and further standards. However, this architecture, as presented, is considered rather "terse," and not sufficient for full implementation without further architectural development.

One particular challenge arising from the ETSI MANO architecture relates to communication between the virtual network function manager (VNFM) and each virtual machine that implements virtualized network function component instantiation (VNFCI) as the original architecture. As presented, the ETSI MANO architecture requires the development of communication channels between the VNFM and the VNFCI, which presents negative limitations, including, but not limited to, scalability problems and loss of efficiency as the number of virtual machines grows. In particular, the ETSI MANO architecture requires connectivity between the control plane of the NFV operator and the service plan of the tenants, which undesirably increases the attack surface of the infrastructure, while also enabling denial-of-service attacks against the infrastructure. Accordingly, it is desirable to provide security and efficiency improvements to the implementation of this conventionally proposed architecture.

BRIEF SUMMARY

In an embodiment, a virtual network system for a computer network is provided. The system includes a first host executing a virtual network function manager. The system also includes a second host executing a management virtual machine. The management virtual machine is in communication with the virtual network function manager and with one or more virtual network function component instantiations. The management virtual machine is programmed to route messages between the one or more virtual network function component instantiations and the virtual network function manager.

In an additional embodiment, a method for providing virtual network functions is provided. The method is implemented by at least one processor in communication with at least one memory device. The method includes executing a management virtual machine for communicating with a remote host computing device over a first computer network. The method also includes executing a plurality of virtual network function component instantiations. The method further includes receiving status information about a first virtual network function component instantiation of the plurality of virtual network function component instantiations. In addition, the method includes transmitting the status information to the remote host computing device via the first computing network. Moreover, the method includes receiving a request from the remote host computing device via the first computing network. Furthermore, the method includes executing the request one the first virtual network function component instantiation.

In a further embodiment, a host computing device is provided. The host computing device includes at least one processor in communication with at least one memory device. The at least one processor is programmed to execute a management virtual machine for communicating with a remote host computing device over a first computer network. The at least one processor is also programmed to execute a plurality of virtual network function component instantiations. The at least one processor is further programmed to receive status information about a first virtual network function component instantiation of the plurality of virtual network function component instantiations. In addition, the at least one processor is programmed to transmit the status information to the remote host computing device via the first computing network. Moreover, the at least one processor is programmed to receive a request from the remote host computing device via the first computing network. Furthermore, the at least one processor is programmed to execute the request one the first virtual network function component instantiation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
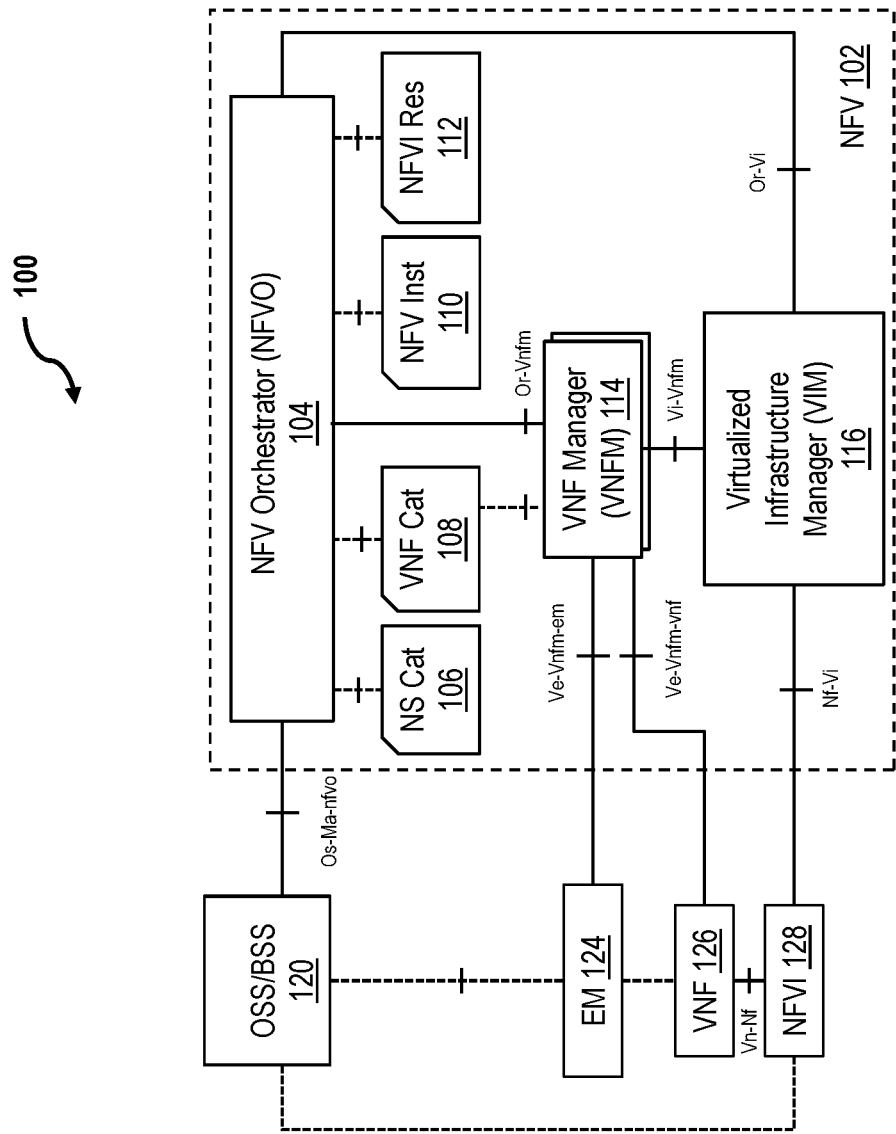
FIG. 1 is a schematic illustration of an exemplary computer network for a Network Function Virtualization architecture, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide innovative systems and methods for computer networks within NFV environments. The present embodiments introduce, among other solutions, techniques for communication between virtual network functions (VNF) and VNFMs to ensure secure and efficient communication. The present embodiments are advantageously applicable in the ETSI NFV Management and Orchestration (MANO) environment and architecture.

The NFV embodiments herein add new capabilities to communications networks, while also providing new management and orchestration functions that may be added to existing operation, administration, maintenance, and provisioning models. In legacy networks, Network Function (sometimes labeled "NF") implementations are often tightly coupled with the infrastructure on which they run. In contrast, the present NFV embodiments enable decoupling of Network Functions software implementations from the computation, storage, and networking resources used by the Network Functions. The present virtualization techniques are thus capable of insulating the Network Functions from those resources through a virtualization layer.

The present decoupling techniques thus further expose a new set of entities, i.e., the VNFs, and a new set of relationships between the VNFs and the NFV Infrastructure (NFVI). In some embodiments, the VNFs may be chained with other VNFs and/or Physical Network Functions (PNFs) to realize a Network Service (NS).

The management and orchestration of virtualized resources herein may be further leveraged to providing VNFs with additional resources as needed. Resource allocation in the NFVI, for example, is a potentially complex task, since a considerable number of requirements and constraints may need to be met simultaneously. Some known network allocation requirements add complexity in comparison with known resource allocation strategies for computing resources in virtualized environments. For example, some VNFs require low latency or high bandwidth links to other communication endpoints.

The systems and methods disclosed herein describe specific connections between the VNFs and the virtual network function manager (VNFM) to (i) improve security, and (ii) increase efficiency. More specifically, the present systems and methods enable the complete separation of an operator's infrastructure from tenant VNFs, such that the infrastructure and VNFs may be configured to run on separate networks. This separation may advantageously prevent tenants from accessing the operator's infrastructure. In some embodiments, the VNFM may be configured to communicate only to one specialized virtual machine on the host that is part of the NFV operator infrastructure. In an exemplary embodiment, the VNFM is further configured with learning capability, such that the VNFM may learn the states of all of the virtualized network function component instantiations (VNFCI) without requiring any direct interaction with any VNFCI. Having learned these states, the VNFM is further enabled to make control decisions and act upon all of the VNFCIs, also without requiring direct interaction therewith.

In an embodiment, host hardware is equipped with two network interface cards (NIC), where each NIC is associated with its own IP address. The first NIC is connected to a Command and Control Network, which, in an exemplary embodiment, only connects to management entities, such as the VNFM. The second NIC is connected to the overall hosting network, for hosting the application infrastructure. The virtual NICs of all of the VNFCIs may be mapped onto the second NIC, and in such cases, the first NIC may then be used exclusively by a specialized management virtual machine (VM), such as Domaine0 in XEN hypervisors. In some embodiments, the specialized management VMs have access to the hypervisor administrative application programming interface (API).

FIG. 1 is a schematic illustration of an exemplary computer network 100 for an NFV architecture 102. NFV architecture 102 represents, for example, a system according to the ETSI NFV Management and Operations (MANO) specification, and includes an NFV orchestrator (NFVO) 104, an NS catalog 106, a virtual network functions (VNF)

catalog 108, NFV instances 110, NFVI resources 112, a VNF manager (VNFM) 114, and a virtualized infrastructure manager (VIM) 116.

In an exemplary embodiment, network 100 includes an operations support systems/business support systems (OSS/BSS) functional block 120 for, and in communication with, the NFV architecture 102. The network 100 also includes element managers (EM) 124, virtual network functions 126, and network functions virtualization infrastructure (NFVI) 128.

In an embodiment, the NFV orchestrator 104 orchestrates the NFVI resources across multiple VIMs 116, and is configured to manage the lifecycle of network services. The NS Catalogue 106 represents the repository of all on-boarded Network Services and supports the creation and management of the network services deployable templates. The VNF Catalogue 108 represents the repository of all of the on-boarded VNF packages and supports the creation and management of the VNF packages. The NFV Instances 110 repository holds information of all VNF instances 126 and network service instances. Each VNF instance 126 is represented by a VNF record and each ES instance is represented by an ES record. These records are updated during the lifecycle of respective instances. The NFVI Resources 112 repository receives and stores information about available, reserved, and allocated NFVI resources as abstracted by the VIM 116 across the operator's Infrastructure Domains.

The VNFM 114 is responsible for the lifecycle management of VNF 126 instances. In some embodiments, the VNFM 114 is assigned the management of a single VNF 126 instance. In an exemplary embodiment, the VNFM 114 is assigned the management of a plurality of VNF 126 instances, of the same type or of different types. In some embodiments, the VNF Manager 114 functions are generic common functions applicable to any type of VNF 126. In other embodiments, some VNF 126 instances require specific functionality associated with their individual lifecycle. This functionality may be specified in the individual VNF's package.

In the exemplary embodiment, the VNFM 114 performs multiple functions for each VNF 126 associated with it. These functions may include, but are not limited to, VNF instantiation (including VNF configuration), VNF instantiation feasibility checking, VNF instance software updates and upgrades, VNF instance modification, VNF instance scaling, VNF instance-related collection of NFVI performance measurement results, VNF instance healing, VNF instance termination, VNF lifecycle management change notification, management of the integrity of the VNF instance throughout its lifecycle, and the overall coordination and adaption role for configuration and event reporting between the VIM 116 and the EM 124.

In an exemplary embodiment, the VIM 116 is configured to control NFVI 128 resources. The OSS/BSS 120 are a combination of other operations and business support functions of the operator that are not explicitly captured by the NFV 102. EM 124 is responsible for the FCAPS management functionality of a VNF 126. FCAPS stands for "Fault Management, Configuration Management, Accounting Management, Performance Management, and Security Management." EM 124 performs functions such as, but not limited to, configuration for the network functions provided by the VNF 126, fault management for the network functions provided by the VNF 126, accounting for the usage of the VNF functions, collecting performance measurement results for the functions provided by the VNF 126, and security management for the VNF functions. In some embodiments, the EM 124 collaborates with the VNFM 114 to perform those functions that require exchanges of information regarding the NFVI resources associated with the VNF 126. The NFVI 128 encompasses the hardware and software components that provided the infrastructure resources where VNFs 126 are deployed.

Figure 2:
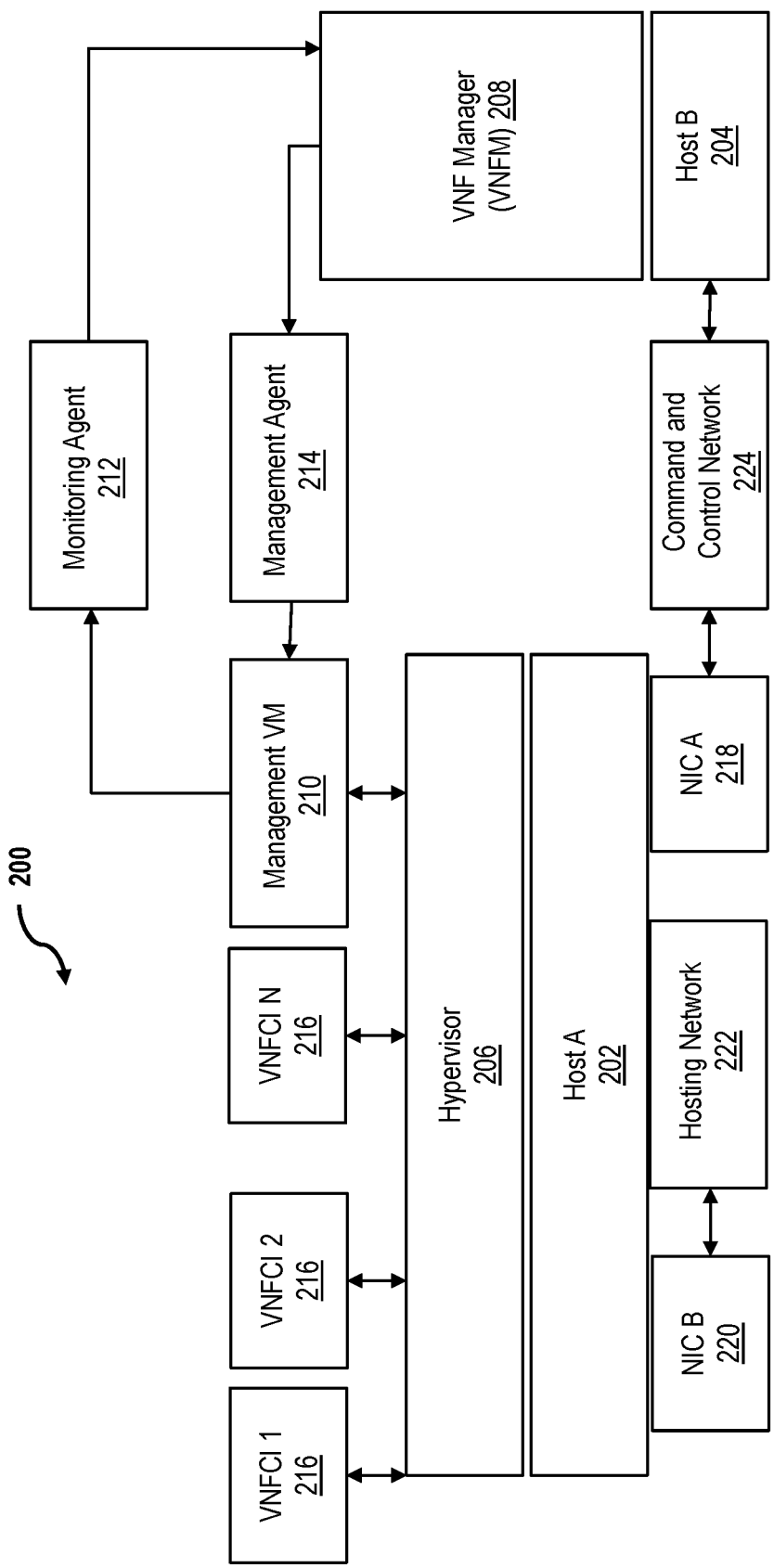
FIG. 2 is a schematic illustration of an alternative computer network for an enhanced Network Function Virtualization architecture, in accordance with an embodiment.

FIG. 2 is a schematic illustration of an alternative computer network 200 for an enhance NFV architecture, in accordance with an embodiment.

In an exemplary embodiment, network 200 includes at least host A 202 and host B 204. In network 200, hypervisor 206 is executed by host A 202. In some embodiments, host A 202 is single computer device. In other embodiments, host A 202 represents a plurality of computer devices. In network 200, virtual network function manager (VNFM) 208 is executed by host B 204. In the exemplary embodiment, VNFM 208 is similar to VNFM 114 shown in FIG. 1. In some embodiments, host B 204 is single computer device. In other embodiments, host B 204 represents a plurality of computer devices.

In an embodiment, hypervisor 206 executes a management virtual machine (VM) 210 and a plurality of virtual network function component instantiations (VNFCI) 216. In the exemplary embodiment, VNFCI 216 is similar to VNF 126 shown in FIG. 1. Host A 202 contains the VNFCIs 26, each of which is a virtual machine. Management VM 210 includes a monitoring agent 212 and a management agent 214. In the exemplary embodiment, monitoring agent 212 and management agent 214 are each in one-way communication with VNFM 208, where monitoring agent 212 transmits messages to VNFM 208 and management agent 214 receives messages from VNFM 208. In other embodiments, the management VM 210 is in direct two-way communication with the VNFM 208.

In an exemplary embodiment, host A 202 includes two separate NICs 218 and 220. In this embodiment, each NIC 218 and 220 is associated with its own IP address. The NIC A 218 is connected to a Command and Control Network 224. The Command and Control Network 224 is only connected to management entities, such as the VNFM 208. The NIC B 220 is connected to the overall hosting network 222, for hosting the application infrastructure. The virtual NICs of all of the VNFCIs 216 are mapped onto NIC B 220. The NIC A 218 is used exclusively by the specialized management virtual machine (VM) 210. In some embodiments, the specialized management VMs 210 have access to the hypervisor administrative API.

In an exemplary embodiment, the management VM 210 runs at least two processes, namely (i) monitoring agent 212, and (ii) management agent 214. In this example, both monitoring agent 212 and management agent 214 are considered interlocutors of the VNFM 208. The monitoring agent 212 collects information relevant to the execution of the VNFCIs 216 and transmits that information to the VNFM 208. In some embodiments, the monitoring agent 212 uses the hypervisor APIs to collect the information. In at least one embodiment, the monitoring agent 212 transmits the information in specific types of messages, such as notifications, which information may be transmitted periodically, or may be requested by the VNFM 208, such as through the management agent 214. In an exemplary embodiment, the management agent 214 receives messages, such as requests, from the VNFM 208 and executes those requests. In some embodiments, the management agent 214 executes the requests using the hypervisor API and/or the commands of the local operating system.

In an embodiment, the VNFM 208 is further configured to use such received information to make decisions that may be based on, but not limited to, (i) information accumulated from notifications from the monitoring agent 212, (ii) information received from other management entities, such as the NFV orchestrator 104 (shown in FIG. 1), (iii) information contained in the virtual network function description, and (iv) policy engines. In some embodiments, other sources of decision information may include lawful interception administration, and/or various administrative functions.

Based on the decisions made by the VNFM 208, the VNFM 208 generates requests and transmits them to the management agent 214 which then executes the requests. Examples of such requests include, but are not limited to, VNF instantiation, VNF instance queries, VNF instance updates, VNF instance updates, VNF instance scaling, VNF instance termination, forwarding of configuration and events from the VNF 216 to the VNFM 208, forwarding of configuration and events about the VNF 216 from the VNFM 208 to the VNF 216, and verification that the VNF 216 is still alive or functional.

By having the management VM 210 and its agents act as interlocutors for the VNFM 208, the VNFM 208 is advantageously configured such that it requires no direct contact with the VNFs 216, and vice versa. Since the VNFM 208 is able to make its decisions based on communications through one set of communication channels, through the management VM 210, rather than having channels to each of the VNFs 216, the communications according to the present systems and methods are more efficient than conventional techniques. The present information collection and dissemination system thus provides the VNFM 208 with the information needed to assess, and even predict, the behavior of each VNF 216. Additionally, since the VNFM 208 and the interlocutor(s) in this embodiment communicate over the separate Command and Control network 224, no VNFCI 216 requires passive or active access to that network or the VNFM 208, and therefore the network 200 is enabled to maintain improved levels of security by keeping the hosted infrastructure and the management infrastructure separate from one another.

The network 200 is described above as an exemplary embodiment and arrangement of network components, but not in a limiting sense. The person of ordinary skill in the art, after reading and comprehending the present application, will understand that different and/or expanded network configurations may be implemented to perform the innovative systems and methods described herein, and without departing from the scope of this disclosure, which maintains that the infrastructure management entities be separated from the hosted infrastructure.

According to the several embodiments described herein, separate management infrastructure and hosted infrastructure in an NFV environment may be centrally implemented in a variety of different technological environments, and without requiring any structural (i.e., hardware) changes to the existing computer networks of such technological environments. The present embodiments therefore provide significant advantages over computer network environments with combined or intertwined infrastructures, which would necessarily be confined to more limited technological environments, or otherwise require significant modifications thereto.

Exemplary embodiments of systems and methods for separate management infrastructure and hosted infrastructure in an NFV environment are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The computer-implemented methods discussed herein may include additional, fewer, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or by computer-executable instructions stored on non-transitory computer-readable media or medium.

Additionally, the computer systems discussed herein may include additional, fewer, or alternate functionality, including one or more of the functionalities described elsewhere herein. The computer systems according to the present embodiments may also include or be implemented by computer-executable instructions stored on non-transitory computer-readable media or medium.

The improvements described herein may be achieved by performing one or more of the following steps: (a) execute a management virtual machine for communicating with a remote host computing device over a first computer network; (b) execute a plurality of virtual network function component instantiations; (c) receive status information about a first virtual network function component instantiation of the plurality of virtual network function component instantiations; (d) transmit the status information to the remote host computing device via the first computing network; (e) receive a request from the remote host computing device via the first computing network; (f) execute the request one the first virtual network function component instantiation; (g) communicate with a second virtual network function component instantiation via a second computer network, where the first computer network and the second computer network are separate; (h) communicate over the first network via the first network interface card; (i) communicate over the second network via the second network interface card; (j) execute a hypervisor for controlling the plurality of virtual network function component instantiations; (k) terminate the first virtual network function component instantiation based on the received request; (l) execute a first agent for transmitting messages to the remote host computing device; and (m) execute a second agent for receiving messages from the remote host computing device.

The aspects described herein may be implemented as part of one or more computer components such as a client device and/or one or more back-end components, such as a host device, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

For instance, aspects include routing communications between separate networks to ensure security and limiting communication channels to improve efficiency. In doing so, the aspects overcome issues associated with having compromised devices infect other devices and ensuring proper communications between a VNFM and a VNFCI. Furthermore, these aspects reduce the chance of data compromise and allow for proper access to the communications. Without the improvements suggested herein, additional processing and memory usage, or even direct human intervention, would be required to perform such activities. Additional technical advantages include, but are not limited to: (i) improved speed and responsiveness in communication with a connected device; (ii) improved security of virtual network function managers; (iii) allowing the virtual network function manager to control more VNFCIs; (iv) reducing the chance of malicious communications; (v) allowing for protected two-way communication; and (vi) preventing the VNFCIs from having direct access to their managers. Additional technical advantages are described in other sections of the specification.

Furthermore, the embodiments described herein improve upon existing technologies, and improve the functionality of computers, by more accurately predict or identify the current security status of any connected device. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of virtual network functions, which have been historically associated with a poor record of securing communications and data. The present embodiments enable more reliable updating and control of such functions, but without compromising data and communications. Furthermore, according to the disclosed techniques, the monitoring and updating of virtual network functions in greatly improved to improve the security of these functions, the associated computer devices, and the associated computer networks.

Exemplary embodiments of systems and methods for separating infrastructure management entities from the hosted infrastructure are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A virtual network system for a computer network, comprising:
a first host executing a virtual network function manager; and
a second host comprising a first network interface and a second network interface, the second host executing a management virtual machine, wherein the management virtual machine is in communication with the virtual network function manager and with one or more virtual network function component instantiations, and wherein the management virtual machine is programmed to route messages between the one or more virtual network function component instantiations and the virtual network function manager, wherein the second host is separate from the first host, wherein the management virtual machine executed by the first host includes a monitoring agent and a management agent, wherein the monitoring agent transmits messages to the virtual network function manager by providing one way communication from the management virtual machine to the virtual network function manager and the management agent receives messages from the virtual network function manager by providing one-way communication from the virtual network function manager to the management virtual machine.

2. The system of claim 1, wherein the first host and the second host are connected via a Command and Control Network via the first network interface.

3. The system of claim 2, wherein the second host is connected to a host network via the second network interface, wherein the host network is connected to the one or more virtual network function component instantiations, and wherein the first host and the virtual network function manager are isolated from the host network.

4. The system of claim 1, wherein the second host executes a hypervisor in communication with the management virtual machine and the one or more virtual network function component instantiations.

5. The system of claim 1, wherein the monitoring agent transmits notifications to the virtual network function manager, wherein the notifications include information about the one or more virtual network function component instantiations.

6. The system of claim 1, wherein the managing agent receives requests from the virtual network function manager, wherein the managing agent executes the requests on the one or more virtual network function component instantiations.

7. A method for providing virtual network functions implemented by at least one processor in communication with at least one memory device and further in communication with a first network interface and a second network interface, the method comprising:
- executing a management virtual machine for communicating with a remote host computing device over a first computing network via the first network interface;
- executing a plurality of virtual network function component instantiations;
- executing a first agent for transmitting messages to the remote host computing device by providing one-way communication from the management virtual machine to the remote host computing device;
- executing a second agent for receiving messages from the remote host computing device by providing one-way communication from the remote host computing device to the management virtual machine;
- receiving status information about a first virtual network function component instantiation of the plurality of virtual network function component instantiations;
- transmitting the status information to the remote host computing device via the first computing network;
- receiving a request from the remote host computing device via the first computing network; and
- executing the request one the first virtual network function component instantiation.

8. The method of claim 7 further comprising communicating with a second virtual network function component instantiation via a second computing network via the second network interface, where the first computing network and the second computing network are separate.

9. The method of claim 7 further comprising executing a hypervisor for controlling the plurality of virtual network function component instantiations.

10. The method of claim 7 further comprising terminating the first virtual network function component instantiation based on the received request.

11. A host computing device comprising at least one processor in communication with at least one memory device and further comprising a first network interface and a second network interface, the at least one processor programmed to:
- execute a management virtual machine for communicating with a remote host computing device over a first computing network via the first network interface;
- execute a plurality of virtual network function component instantiations;
- execute a first agent for transmitting messages to the remote host computing device by providing one-way communication from the management virtual machine to the remote host computing device;
- execute a second agent for receiving messages from the remote host computing device by providing one-way communication from the remote host computing device to the management virtual machine;
- receive status information about a first virtual network function component instantiation of the plurality of virtual network function component instantiations;
- transmit the status information to the remote host computing device via the first computing network;
- receive a request from the remote host computing device via the first computing network; and
- execute the request one the first virtual network function component instantiation.

12. The host computing device of claim 11, wherein the at least one processor is further programmed to communicate with a second virtual network function component instantiation via a second computing network via the second network interface, where the first computing network and the second computing network are separate.

13. The host computing device of claim 11, wherein the at least one processor is further programmed to execute a hypervisor for controlling the plurality of virtual network function component instantiations.

14. The host computing device of claim 11, wherein the at least one processor is further programmed to terminate the first virtual network function component instantiation based on the received request.

* * * * *